(12) United States Patent
Nielsen (10) Patent No.: US 6,186,027 B1
(45) Date of Patent: Feb. 13, 2001

(54) HANDLEBAR STEM ASSEMBLY FOR BICYCLE FORK

(76) Inventor: Peter M. Nielsen, 21 Nut Island Ave., Quincy, MA (US) 02169

( * ) Notice: Under 35 U.S.C. 154(b), the term of this patent shall be extended for 0 days.

(21) Appl. No.: 09/511,055

(22) Filed: Feb. 23, 2000

(51) Int. Cl.[7] ................................................ B62K 21/18
(52) U.S. Cl. .......................................... 74/551.1; 403/365
(58) Field of Search .............................. 74/551.1, 551.3; 280/279, 280; 403/365, 299

(56) References Cited

U.S. PATENT DOCUMENTS

| | | | |
|---|---|---|---|
| 5,517,878 | * | 5/1996 | Klein et al. ................. 74/551.1 X |
| 5,553,511 | * | 9/1996 | Marui ............................. 74/551.1 |
| 5,588,336 | * | 12/1996 | Chou ............................. 74/551.1 |

* cited by examiner

Primary Examiner—Mary Ann Green
(74) Attorney, Agent, or Firm—Pandiscio & Pandiscio (57) ABSTRACT

A bicycle stem assembly comprising a bicycle stem having a novel ways for securing it to an unthreaded bicycle fork steerer tube, the novel means featuring a castellated bushing for pre-loading the upper bearing for the steerer tube and a clamp carried by the stem for selectively locking the stem and bushing to the steerer tube.

19 Claims, 5 Drawing Sheets

HANDLEBAR STEM ASSEMBLY FOR BICYCLE FORK

BACKGROUND OF THE INVENTION

This invention relates to improvements in bicycle handlebar stems and more particularly to an improved assembly for securing a bicycle stem to a bicycle fork steerer tube.

DESCRIPTION OF THE PRIOR ART

The handlebar of a bicycle is coupled to the bicycle frame by means of a stem having a vertical tube which is secured to the steerer tube of the fork to which the front wheel is attached. Two different approaches have been used extensively for coupling the bicycle handlebar stem to the steerer tube. One approach involves division of an external screw thread on the upper end of the steerer tube onto which is secured the top race of the upper bearing headset assembly, and a lock nut, with the top end of the steering tube terminating flush with or just below the lock nut. With this approach, the vertical tube of the stem is inserted into the steerer tube and carries a threaded fixing stud which in turn carries a wedge nut at its lower end. The fixing stud has a head that is accessible through the top end of the vertical tube of the stem. When the stud is turned, the wedge nut is pulled upwardly against a compensating tapered surface at the lower end of the vertical tube, causing the wedge to be displaced laterally and to tighten against the inner surface of the steerer tube, whereby the stem acts as an extension of the steerer tube.

The second approach uses a stem that comprises a dual clamp section that surrounds the steerer tube. In this arrangement, the length of the steerer tube is extended so as to accommodate the clamp section of the stem. The upper race of the upper bearing is not screwed to the steerer tube. In order to permit pre-loading the steering headset bearing, a star nut is located inside the steerer tube, and a preload cap is engaged with the upper end of the steerer tube, and a threaded studs extends through the cap and is screwed into the star nut. Turning the threaded stud varies the force with which the cap forces the stem into engagement with the outer race of the upper bearing headset and thereby determines the pre-loading of the bearing.

The first approach is complicated and relatively expensive. The second approach offers the advantage of using a lighter weight stem. However, the second approach suffers from the limitation that it is easy to make a mistake in properly positioning the star nut in the steerer tube, and correcting the mistake is difficult since the star nut, by design, tightly grips the steerer tube. Damage caused by forcing removal of the star nut is especially disadvantageous in the case of expensive light weight bicycle frames. As an alternative to the star nut, a small device which expands radially and has internal threads is inserted into the steerer tube in place of the star nut. The expandable device is more easily removable than the star nut, but it suffers from the disadvantage that it makes a tenuous grip on the steerer tube.

A further problem with the foregoing arrangements is that they make it difficult, if not impossible, to pass a brake cable through and out of the upper end of the steerer tube, thus preventing use of the brake assembly invention disclosed in my U.S. Pat. No. 5,803,207, issued Sep. 8, 1998.

OBJECTS AND SUMMARY OF THE INVENTION

The primary object of the invention is to provide a new assembly for positively and securely locking a bicycle stem to an unthreaded steerer tube.

Another object is to provide a novel stem-securing means which is simple and inexpensive to manufacture and use.

Still another object is to provide a bicycle handlebar stem having novel means for securing it to a steerer tube.

A further object is to provide a novel bicycle stem/steerer tube combination that facilitates pre-loading of the steerer tube bearings.

Another object is to provide a method of attaching a bicycle stem to a steerer tube which facilitates pre-loading of the upper bearing for the steerer tube.

A more specific object is to provide an arrangement for securing a stem to a bicycle fork steerer tube that allows a brake cable to extend from brake actuating means carried by the fork up through and out of the upper end of the steerer tube.

The foregoing objects are achieved by utilizing with a non-threaded steerer tube a castellated externally-threaded locking bushing that fits onto the upper end of the steerer tube in position to engage the outer race of the upper steering head bearing, and a bicycle stem that comprises a first split clamp section that closely surrounds the tube and is adapted to be compressed into tight engagement with the steerer tube, and a second split clamp section that surrounds and makes a screw thread connection with the castellated bushing and is adapted to be compressed to squeeze the bushing so as to lock it to the steerer tube. The invention includes a method of assembling the stem and bushing with the steerer tube that facilitates pre-loading of the upper bearing associated with the steerer tube. Other features and advantages of the invention are disclosed or rendered obvious by the following detailed specification.

DETAILED DESCRIPTION OF THE INVENTION

Referring now to the drawings, there is shown a portion of a bicycle frame 2 having at its front end an open-ended tubular member 4 (commonly called a "head tube") which rotatably receives a steerer tube 8 which is an extension of a bicycle wheel- supporting fork member 6. The fork and the tubular member are coupled by a conventional lower steering head bearing assembly 10 which comprises a first (lower) race 12 that is secured to fork 6 (or the lower end of steerer tube 8), and a second (upper) outer race 14 that is secured to the lower end of tubular member 4. The races of bearing assembly 10 may be affixed, i.e., secured in place, by means well known to persons skilled in the art, e.g., a press fit or a screw connection. Although not shown, it is to be understood that bearing assembly 10 also includes a plurality of ball bearings in a retainer ring that is disposed between the two races 12 and 14.

Figure 5:
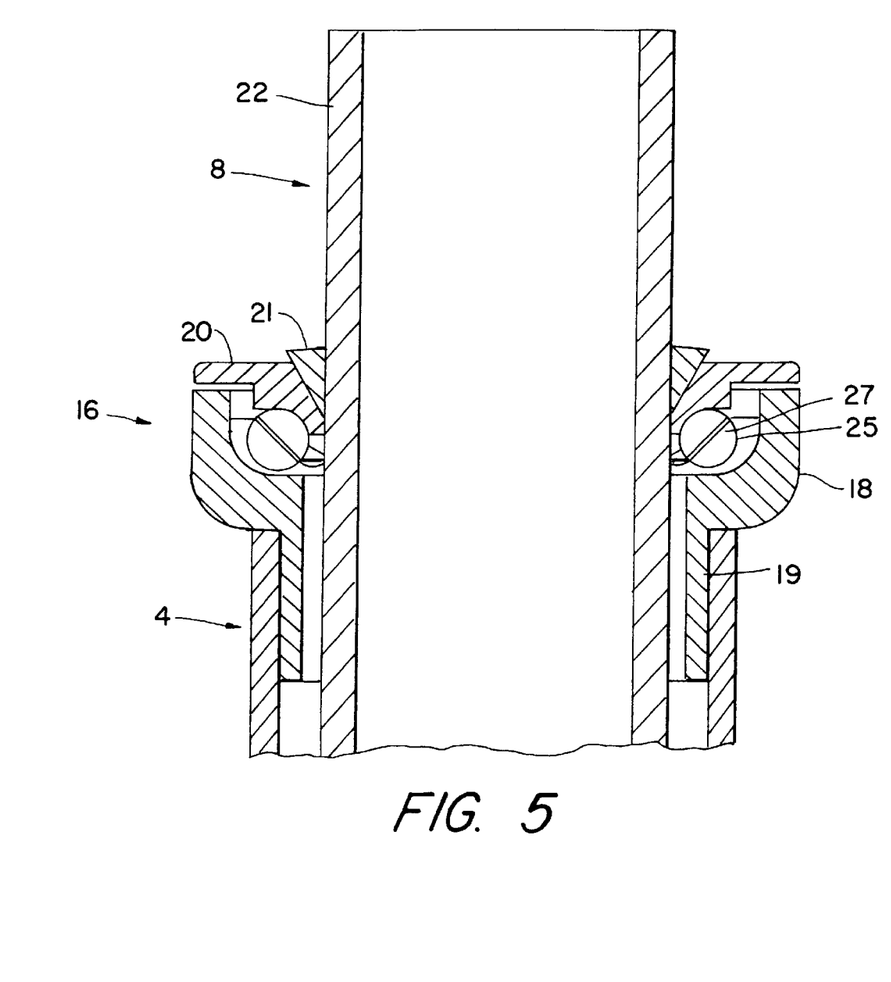
FIG. 5 is a cross-sectional view of a preferred form of upper bearing assembly for coupling the steerer tube to the bicycle head tube.

A second upper bearing assembly 16 is located at the upper end of the tubular member 4. As illustrated in FIG. 5, the bearing assembly 16 comprises a first (lower) race 18 having a tubular extension 19 that is secured to head tube 4. This may be done by way of a press-fit, or by a screw thread connection, or by some other means known to persons skilled in the art. The second (upper) race 20 of bearing assembly 16 surrounds the upper end portion 22 of the steerer tube but is not affixed to that tube. Instead it is free to be rotated relative to steerer until it is locked by action of the locking bushing 32 hereinafter described. The inner surface of upper race 20 is tapered to accommodate a tapered centering ring 21 which is split at one point along its circumference so as to allow it to be compressed radially. Bearing assembly 16 also includes a ball bearing/retainer assembly comprising plurality of ball bearings 25 located in holes in a retainer ring 27 that is disposed between the two races 18 and 20.

Figure 3:
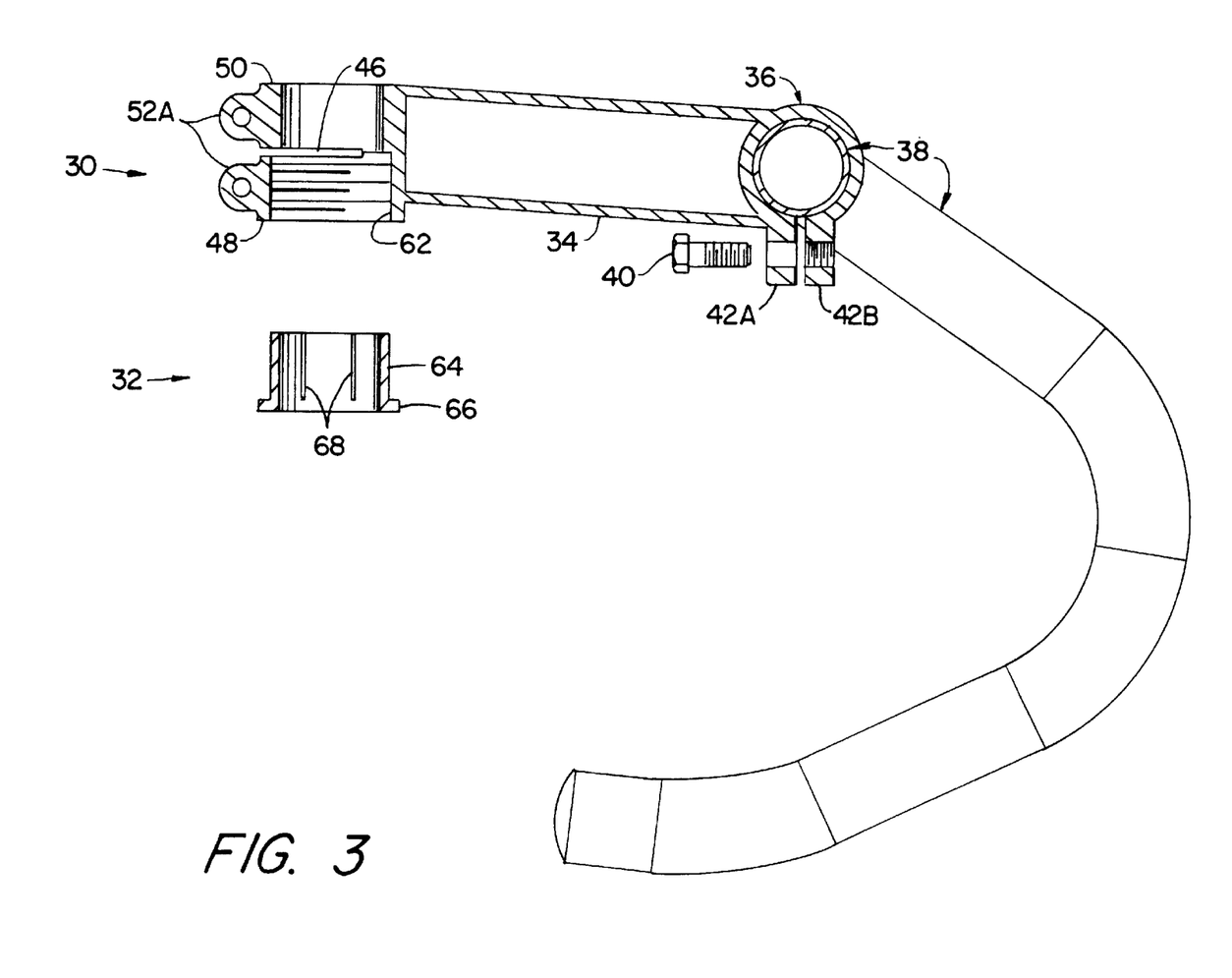
FIG. 3 is a sectional view of the same stem and locking bushing.
Figure 4:
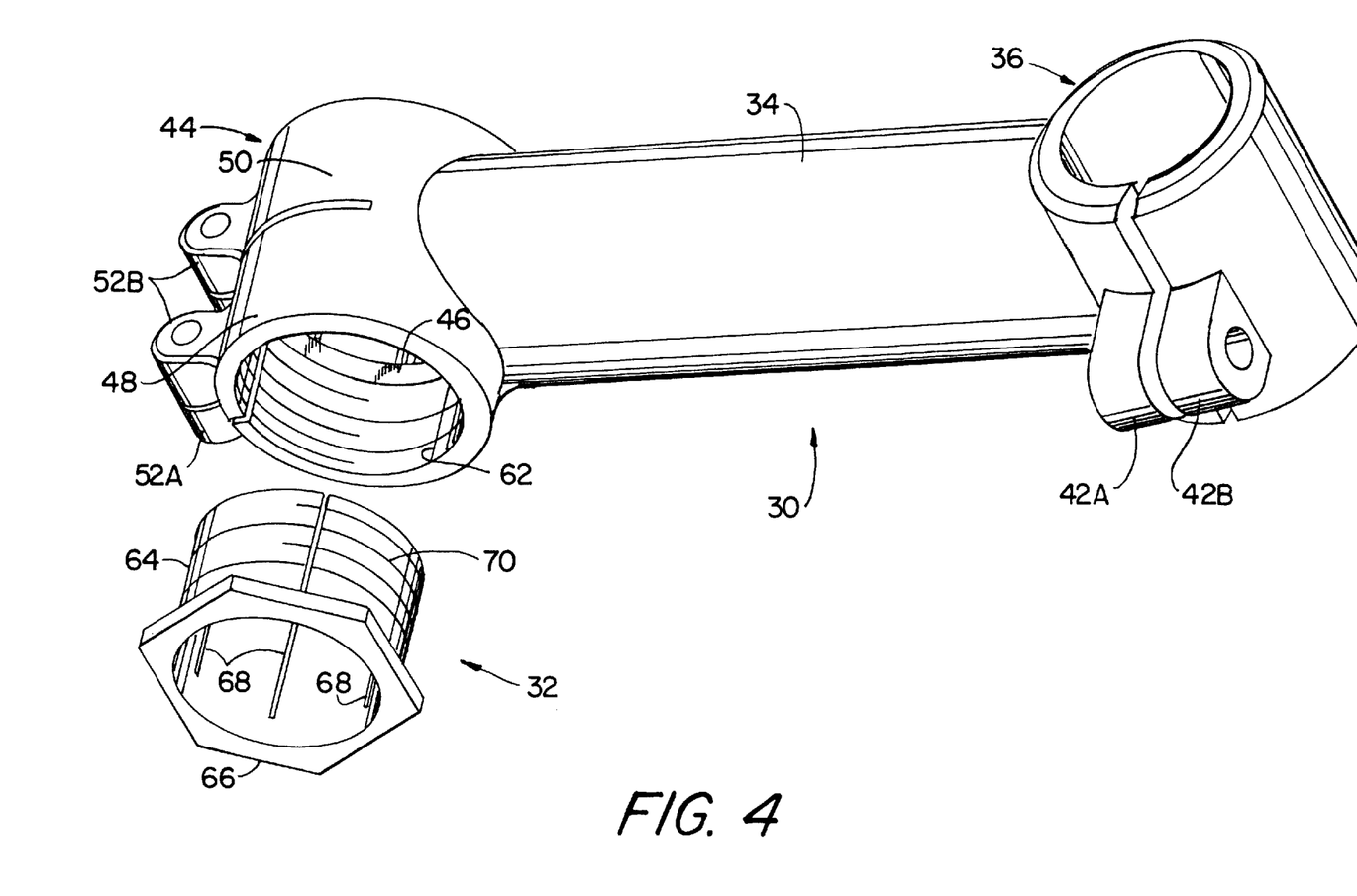
FIG. 4 is an enlarged isometric view of the stem and locking bushing.

The illustrated apparatus further includes a novel stem 30 and a castellated threaded locking bushing 32. Referring to FIGS. 1–4, the stem 30 comprises a body portion 34 having at one end a tubular member 36 for accommodating a typical handlebar 38. The cylindrical member 36 is split and is provided with a pair of lugs 42A, 42B having aligned holes for receiving a screw 40 that is used to draw the lugs together so as to compress the tubular member 36 about the handlebar 38, thereby locking the handlebar in place. As shown in FIG. 3, the hole in lug 42B is threaded to mate with the threaded shank of screw 40. The hole in lug 42A may but need not be threaded, but is sized so that screw 40 can be rotated therein.

The other or rear end of the stem body 34 is provided with a second tubular member 44 which is oriented so that its axis extends at a right angle to the axes of stem body 34 and tubular member 36. The tubular member 44 is slotted transversely to its axis as shown at 46, so as to form two clamp sections 48 and 50. Slot 46 extends through an angle of at least 1800 but less than 3600 along the circumference of tubular member 44. As seen best in FIGS. 2 and 4, each of these clamp sections in turn is split lengthwise at the "six o'clock" position determined relative to body portion 34.

Each of the clamp sections 48 and 50 is provided with a pair of lugs 52A, 52B extending therefrom adjacent where they are split. The lugs 52A, 52B of each clamp section have aligned holes for receiving a screw 56. Although not shown, the holes in lugs 52A are threaded to make a screw connection with screws 56. The holes in lugs 52B may, but need not, be threaded. By turning screws 56 in a given direction it is possible to draw together the lugs 52A, 52B of clamp sections 48 and 50, thereby effectively reducing the inside diameter of those clamp sections. It should be noted that clamp section 48 differs from clamp section 50 in that its inner surface is provided with a screw thread as represented schematically at 62. The two clamp sections are made so that when they are not compressed by action of screws 56, their internal diameters are slightly larger than the outer diameter of the upper end of the steerer tube, preferably about 0.005 inch larger.

The bushing 32 comprises a hollow body section 64 and a peripheral flange 66. The body section 64 is cylindrical, while the flange 66 preferably has a polygonal edge configuration (e.g., hexagonal) to permit it to be grasped by a suitable wrench. Bushing 32 is castellated in the sense that its hollow tubular body portion 64 is slit longitudinally at several locations as indicated at 68. The slits 68 commence at or near flange 66 and extend through the opposite end edge of body section 64, as seen best in FIG. 4. Additionally, the exterior surface of the body portion of bushing 32 has a screw thread as represented schematically at 70 in FIG. 4. Bushing 32 is sized so that its exterior screw thread 70 will make a loose screw connection with the internal screw thread 62 of clamp section 48 when the latter is in its uncompressed condition, i.e., when its screw 56 in lug 52B is completely, or nearly completely, unscrewed from lug 52A.

Figure 1:
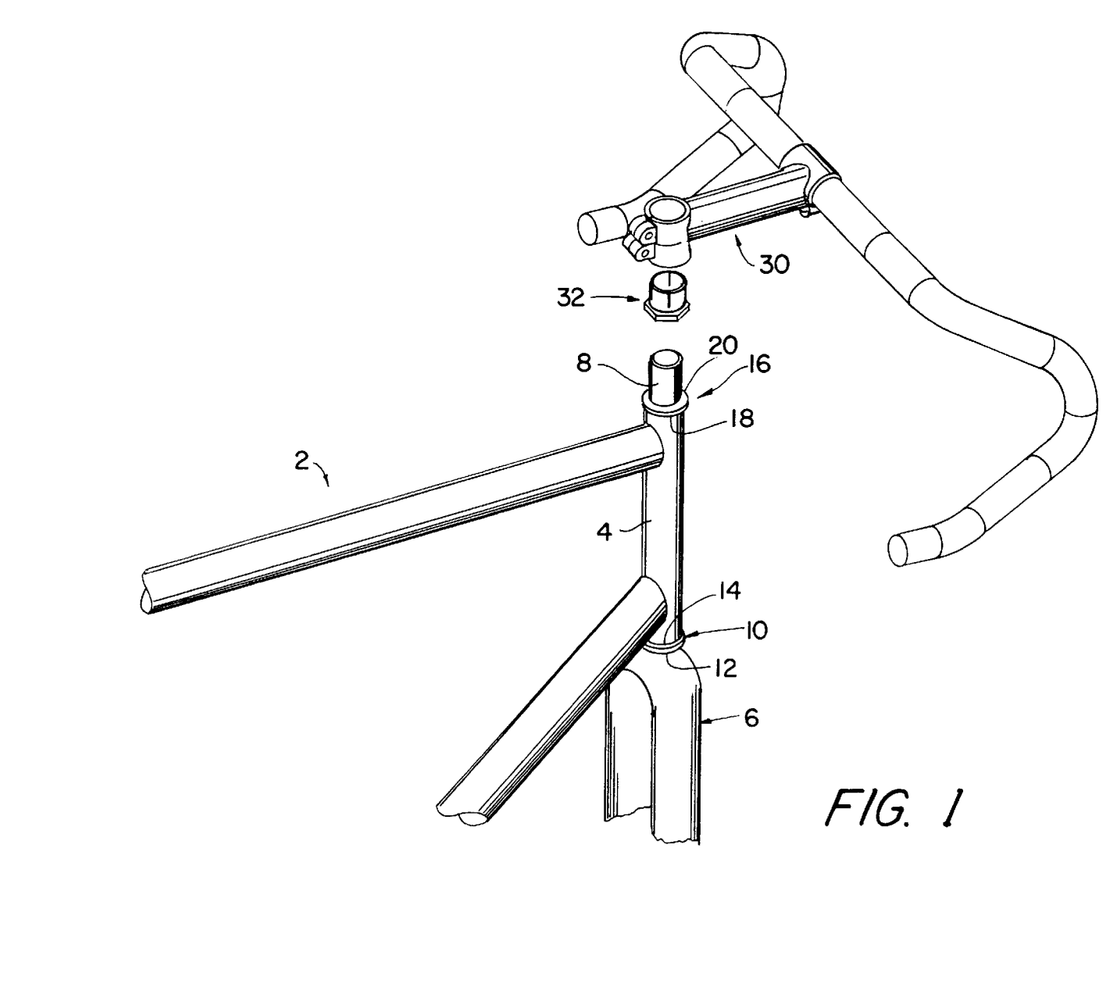
FIG. 1 is a partially exploded fragmentary isometric view of a bicycle frame and fork incorporating a handlebar stem and a locking bushing embodying the invention.
Figure 2:
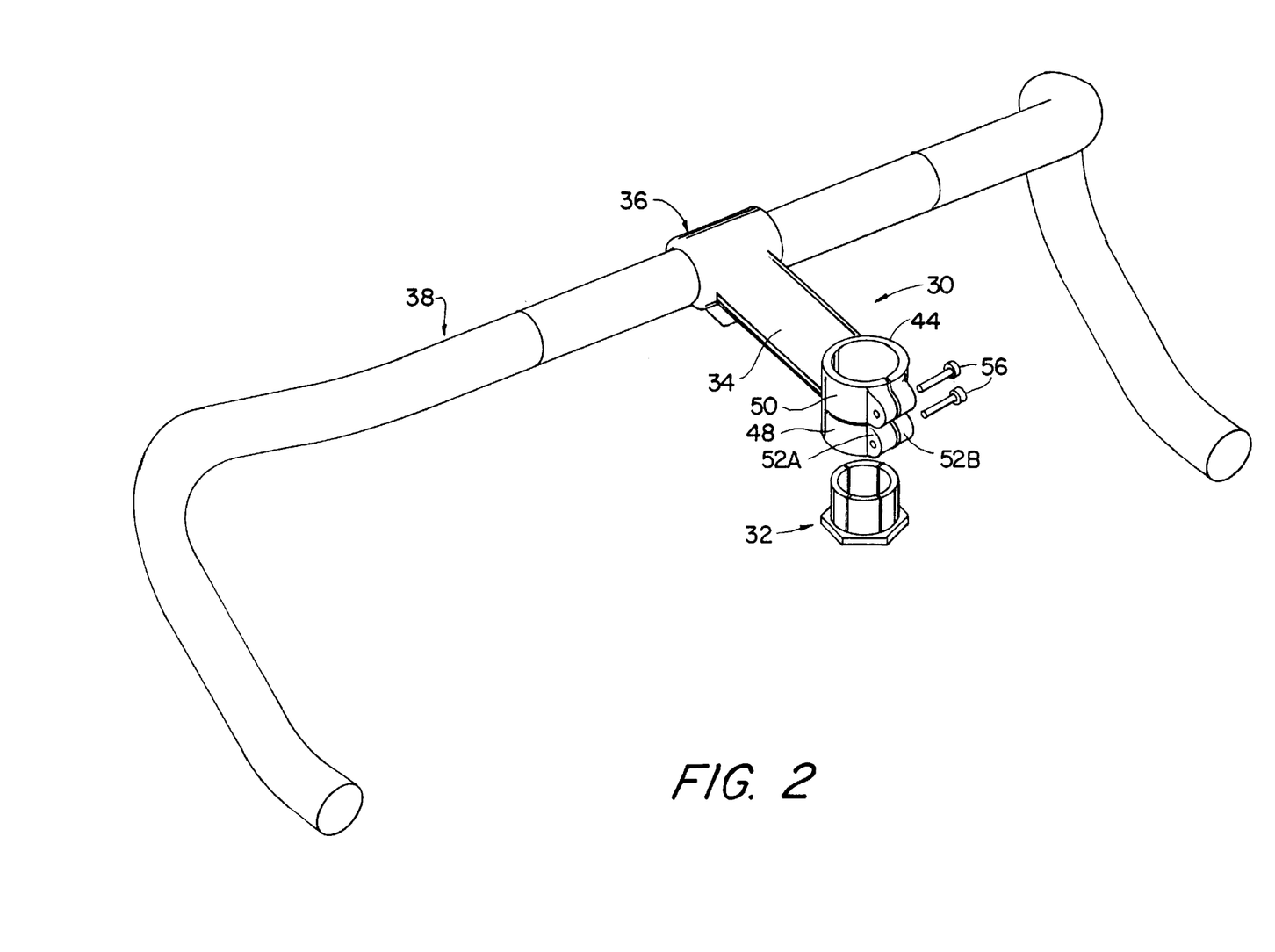
FIG. 2 is a fragmentary isometric view from a different angle of the same stem and locking bushing.

How the handlebar stem and the locking bushing are assembled onto and secured to the steerer tube so as to achieve selective preloading of the upper bearing assembly will now be described. Assume that steerer tube 8 is disposed in head tube 4 as shown in FIG. 1, with the two races of bearing 10 secured in place as previously described, the lower race 18 of bearing 16 secured to head tube 4, and the upper race 20 and the centering ring 21 surrounding but not secured to steerer tube 8. With both of the screws 56 backed off so that the clamp section 48 is expanded enough to accommodate and make a screw connection with bushing 32 and clamp section 50 is large enough to make a close sliding fit on the upper end of the steerer tube, bushing 32 is screwed substantially all the way into clamp section 48. Then, with the bushing in place, stem 30 is slipped onto the steerer tube 22 so that clamp section 50 surrounds the upper end of the steerer tube and the flange 66 of the bushing lies close to or lightly engages the upper race 20 of the upper bearing assembly 16. Then the screw 56 of clamp section 50 is turned so as to cause that clamp section to be drawn into tight clamping relation with the upper end 22 of steerer tube 8. Thereafter, bushing 32 is rotated in a direction to move it away from clamp section 50. As the bushing is backed out of clamp section 48, its flange 66 forces centering ring 21 to exert a downward pressure on the upper race 20 of bearing assembly 16. Centering ring 21 functions to (a) locate the race 20 radially relative to the steerer tube so that the steerer tube is centered relative to that race and (b) also apply an axial preload to bearing 16. The axial pressure applied to the centering ring compresses it down onto the mating taper of the inner surface of race 20, and also radially inward to firmly grip the steerer tube, much like a collet functions. The bushing's position is adjusted so that it exerts a suitable load on bearing assembly 16 that is calculated to eliminate or acceptably minimize axial play of the steerer tube in the frame's head tube 4. Once the desired bearing preloading is achieved, the screw 56 of clamp section 48 is turned in a direction to compress that clamp section radially inward to an extent that compresses the castellated body portion 64 of the bushing into a gripping and locking relations with the steerer tube, with the result that the preload applied to the upper bearing assembly by the bushing will remain fixed.

The foregoing design offers a number of advantages. For one thing, it is simpler than prior arrangements that are designed to permit adjustable preloading of the steerer tube bearing assemblies. Another advantage is that it avoids possible damage to the steerer tube as can occur when using a star nut. It also does not require the steerer tube to be threaded. Additionally, the preloading of the bearing assembly is easily adjusted, requiring in turn only loosening of the screw 56 associated with clamp section 148, rotation of bushing 32, and then re-tightening the screw 56. Another important advantage is that the interior of the steerer tube remains unobstructed, so that it is now possible to pass a brake cable through and out of the upper end of the steerer tube, thereby making it possible to use brake assemblies as disclosed in my U.S. Pat. No. 5,803,207, issued Sep. 8, 1998.

Still another advantage is that it is not necessary to cut the steerer tube to a predetermined length, as is required with prior systems. This invention allows the stem to be moved up or down within limits on the steerer tube, while still allowing the castellated bushing to provide desired preloading of the bearings. The new stem architecture further offers the advantage of reduced cost because of its simplicity. Of additional benefit is the fact that bearings 10 and 16 are of conventional design. Still other advantages will be obvious to persons skilled in the art from the foregoing description and the drawings.

Obviously the apparatus as shown in the drawings may be modified without departing from the spirit of the invention, for example, the two clamp members 48 and 50 may be formed as separate members and welded to the stem body 34, rather than constituting portions of a common cylinder. Additionally, the lugs 42A, 42B (and also the lugs 52A, 52B) may be coupled together by a screw and nut arrangement, thereby eliminating the need to a threaded hole in one or both lugs. Similarly, the tubular member 36 at the front end of the stem body 34 also may be modified without affecting the mode of attachment of the stem to the steerer tube. Also various forms of angular contact bearings that require some axial preload to function properly may be used as the lower and upper bearings 10 and 16. Still other modifications will be obvious to persons skilled in the art.

What is claimed is:

1. A bicycle fork and handlebar stem assembly comprising:

a fork steerer tube;

a castellated externally-threaded bushing that fits on an end portion of said steerer tube; and a handlebar stem comprising a body section and first and second split tubular clamp sections formed integral with said body section, said first clamp section surrounding said steerer tube, and said second clamp section surrounding and making a screw thread connection with said bushing, said first clamp section being adapted to be compressed into tight locking engagement with said steerer tube and said second clamp section being adapted to be compressed so as to squeeze said bushing into tight locking engagement with said steerer tube.

2. An assembly according to claim 1 wherein said fork steerer tube is an extension of a bicycle fork for supporting a bicycle wheel, and further wherein said second clamp section is located between said first clamp section and said bicycle fork.

3. An assembly according to claim 1 wherein said bushing comprises a castellated tubular body section and a flange section located at one end of said body section, and further wherein said flange section has an outer diameter greater than the outer diameter of said end portion of said steerer tube.

4. An assembly according to claim 1 wherein each of said first and second clamp sections comprises first and second diametrically opposed clamping portions having first ends thereof formed integral with said body section and second ends having first and second mutually confronting lugs, and screw means connecting said first and second lugs for drawing said first and second clamping portions toward one another whereby to force said first clamp section into tight engagement with said steerer tube and cause said second clamp section to radially compress said bushing into tight engagement with said steerer tube.

5. An assembly according to claim 4 wherein said screw means comprises a threaded bolt that extends through a hole in said first lug and screws into a threaded hole in said second lug.

6. An assembly according to claim 4 wherein one end of said bushing projects out of said second clamp section in position to engage a bearing assembly associated with said steerer tube.

7. An assembly according to claim 1 wherein each of said first and second clamp sections comprises first and second diametrically opposed clamping portions having first ends thereof formed integral with said stem section and second ends having first and second mutually confronting lugs, and screw means connecting said first and second lugs for drawing said first and second clamping portions toward one another whereby to force said first clamp section into tight engagement with said steerer tube and cause said second clamp section to radially compress said bushing into tight engagement with said steerer tube.

8. An assembly according to claim 7 wherein said first and second clamp sections are adjacent to and aligned with one another.

9. An assembly according to claim 8 wherein said first and second clamp sections are formed at one end of said body section.

10. An assembly according to claim 9 wherein said body section has a second end opposite to said first end, and further wherein said second end has means for supporting a handlebar.

11. An assembly according to claim 7 wherein said screw means comprises a threaded bolt that extends through a hole in said first lug and screws into a threaded hole in said second lug.

12. In combination with a bicycle frame having a tubular member having first and second open ends, a wheel-supporting fork having a steerer tube rotatably disposed in and extending through said tubular member with said steerer tube having an outer end that projects from said second open end of said tubular member, a lower bearing assembly comprising a first race secured to said fork and a second race secured to said first open end of said tubular member, and an upper bearing assembly comprising a first race secured to said second open end of said tubular member and a second race surrounding said outer end of said steerer tube;

a castellated bushing closely surrounding said outer end of said steerer tube, said bushing being disposed so that one end thereof confronts said second race of said upper bearing assembly and being formed so as to be capable of axial and rotational movement relative to said steerer tube; and a handlebar stem comprising a stem section adapted to securely support a handlebar device and first and second split tubular clamp sections formed integral with and extending out from said stem section, said first clamp section closely surrounding said outer end of said steerer tube, and said second clamp section surrounding and making a screw thread connection with said bushing, said first clamp section being adapted to be compressed into tight locking engagement with said outer end of said steerer tube and said second clamp section being adapted to be compressed so as to squeeze said bushing into tight locking engagement with said outer end of said steerer tube.

13. An assembly according to claim 12 wherein each of said first and second clamp sections comprises first and second diametrically opposed clamping portions having first ends thereof formed integral with said stem section and second ends having mutually confronting lugs, and screw means connecting said lugs for drawing said first and second clamping portions toward one another whereby to force said first clamp section into tight engagement with said outer end of said steerer tube and cause said second clamp section to radially compress said bushing into tight engagement with said outer end of said steerer tube.

14. A method of assembling the components of the assembly defined by claim 13 comprising the steps of:

(a) screwing said bushing into said second clamp section;

(b) positioning said stem so that said first and second clamp sections surround said outer end of said steerer tube;

(c) manipulating said screw means of said first clamp section so as to lock said first clamp section to said outer end of said steerer tube;

(d) rotating said bushing so as to cause it to engage and force said second race of said upper bearing assembly toward said first race of said upper bearing assembly, so as to preload said bearing assembly; and (e) manipulating said screw means of said second clamp section so as to force said second clamp section to radially compress said bushing into locking engagement with said outer end of said steerer tube.

15. A bicycle fork and handlebar stem assembly comprising:

a fork steerer tube, an end portion of which has a cylindrical outer surface;

a handlebar stem having first and second compression connectors which fit around said fork tube end portion, said first compression connector having an inner surface that is sized to make a close fit with said fork tube end portion, said second compression connector having an inner surface that is provided with a first screw thread; and a castellated bushing surrounding said fork tube end portion and extending into said second compression connector, said bushing having an outer surface that is provided with a screw thread for making a screw connection with said first thread;

said first and second compression connectors each comprising means for tightening said connector around said fork tube and said bushing respectively, whereby said stem is locked to said fork tube and said bushing is compressed into tight engagement with said fork tube.

16. A handlebar stem assembly for attachment to a bicycle fork steerer tube comprising:

a castellated externally-threaded bushing adapted to fit on a bicycle fork steerer tube; and a handlebar stem comprising a body section and first and second split tubular clamp sections formed integral with said stem section, said first clamp section being adapted to surround and be compressed into tight locking engagement with a bicycle fork steerer tube, and said second clamp section surrounding and making a screw thread connection with said bushing and being adapted to be compressed so as to squeeze said bushing into tight locking engagement with said bicycle fork steerer tube.

17. An assembly according to claim 16 wherein said bushing comprises a castellated tubular body section and an exterior flange section at one end of said body section.

18. An assembly according to claim 16 wherein one end of said bushing projects out of said second clamp section.

19. A bicycle handlebar stem assembly comprising:

a handlebar stem having first and second compression connectors each adapted to extend around a fork steerer tube, with said second compression connector having an inner surface that is provided with a first screw thread; and a castellated bushing sized to fit within said second compression connector, said bushing having an outer surface that is provided with a screw thread for making a screw connection with said first screw thread and an inner surface shaped to surround a fork steerer tube;

said first compression connector having means for tightening said first compression connector around a fork steerer tube that is surrounded by said first compression connector, and said second compression connector having means for tightening said second compression connector around said bushing.

\* \* \* \* \*

UNITED STATES PATENT AND TRADEMARK OFFICE
CERTIFICATE OF CORRECTION

PATENT NO. : 6,186,027 B1  
DATED : February 13, 2001  
INVENTOR(S) : Peter M. Nielsen Page 1 of 1

It is certified that error appears in the above-identified patent and that said Letters Patent is hereby corrected as shown below:

Claim 7, column 6,
Line 4, change "stem" to -- body --;

Claim 12, column 6,
Line 43, change "stem" (second occurrence) to -- body --;
Line 46, change "stem" to -- body --;

Claim 13, column 6,
Line 59, change "stem" to -- body --;

Claim 16, column 8,
Line 7, change "stem" to -- body --.

Signed and Sealed this

Second Day of October, 2001

Attest:

NICHOLAS P. GODICI
Attesting Officer
Acting Director of the United States Patent and Trademark Office